Patented June 30, 1925.

1,544,535

UNITED STATES PATENT OFFICE.

CARLETON ELLIS AND NORRIS BOEHMER, OF MONTCLAIR, NEW JERSEY, ASSIGNORS TO CHADELOID CHEMICAL COMPANY, A CORPORATION OF WEST VIRGINIA.

CHLORINATED RUBBER COMPOUND AND PROCESS OF MAKING SAME.

No Drawing.   Application filed May 18, 1923.   Serial No. 639,983.

*To all whom it may concern:*

Be it known that we, CARLETON ELLIS and NORRIS BOEHMER, citizens of the United States, and residents of Montclair, in the county of Essex and State of New Jersey, have invented certain new and useful Improvements in Chlorinated Rubber Compounds and Processes of Making Same, of which the following is a specification.

This invention relates to chlorinated rubber compounds and to the process of making same and relates especially to products obtained by treating rubber with chlorine in a liquid state or under high pressure, the chlorine preferably being used in excess to form perchlorinated compounds of novel properties.

Ordinary raw or unvulcanized rubber is difficultly soluble in various organic solvents and forms extremely viscous solutions which are slow-drying and form a sticky coating which is rather readily oxidized and disintegrated. Raw rubber therefore cannot be used advantageously for coating purposes. By chlorinating rubber the solubility is improved and the drying qualities greatly enhanced. These qualities in a general way improve with the degree of chlorination. Chlorine combines readily with rubber to form lower chlorinated compounds, 4 mols of chlorine being generally regarded necessary to form a saturated compound or rubber tetrachloride. This addition compound contains approximately 40 per cent of chlorine. While its solubility in organic solvents is greater than that of the raw rubber it is not sufficient for many purposes. By treating rubber in carbon tetrachloride with chlorine at ordinary atmospheric pressure it is possible to increase the degree of chlorination by introducing chlorine by substitution, hydrochloric acid being evolved. In this way hexa or hepta chlor rubber may be obtained. These compounds however lack certain qualities which exist in chlorinated compounds of a higher stage of chlorination.

It is particularly an object of the present invention to produce such compounds of a higher stage of chlorination or what may be termed perchlorinated rubber. Products of intensive chlorination of rubber which have a perchlorinated structure are relatively very soluble in various hydrocarbons and are notably resistant to reagents. For example films of such material which have been exposed to the action of concentrated nitric, hydrochloric and sulphuric acid have not been attacked. Hydrofluoric acid also is without action. Films preserved for an indefinite period in the cold in a 10 per cent solution of caustic soda have shown no change. Such qualities of resistance renders these perchlorinated compounds highly desirable as coating agents in chemical and other industries.

The raw material employed is crude or unvulcanized rubber such as ordinary crepe rubber. Rubber latex also may be treated by the present process. The presence of sulphur in the rubber generally speaking is undesirable especially when present in any extensive amount as the chlorine unites with the sulphur to form sulphur chloride which reacts upon the rubber to form insoluble bodies. Therefore when solubility is an important consideration vulcanized rubber should not be used. For some applications however vulcanized rubber such for example as old inner tubes of automobiles may be treated by the present process. Recovered rubber also may be used in some cases. The process also contemplates the treatment of gutta percha or balata or products of a nature kindred to rubber.

The chlorine used may be ordinarily liquid chlorine or chlorine under high pressure. In order to increase the pressure and rate of chlorination the receptacle containing the liquid chlorine may be heated if desired.

In carrying out the invention a preferred method is that of submerging masses or fragments of the rubber in liquid chlorine or running liquid chlorine onto fragments or sheets of rubber and permitting the reaction to progress in a confined space in order to secure the very desirable accelerating effect of pressure. By employing an excess of chlorine over that which the rubber would combine with chemically a solvent effect is secured which gives rise to products of novel qualities. The excess of chlorine acts as a solvent or flux and the resultant product may vary from a viscous mass to a thin liquid depending upon the quantity of chlorine which has been introduced. Liquid chlorine has a notable solvent action on chlorinated rubber and on exposure of the mass to atmospheric pressure or upon a reduction in pressure the excess of chlorine is removed to a greater or less extent. When the chlorine has been largely expelled from a solution of perchlorinated rubber in liquid chlorine frequently masses of the perchlorinated product will be found which are clear and transparent possessing a light yellow color. The rubber originally used may be substantially opaque but the chlorinated product obtained from solution in liquid chlorine in some cases will be a clear transparent mass. This transparency is more particularly noticeable in the bubbles or films which form in the container on evaporating such a solution. In thicker masses especially on account of the formation of many small bubbles and possibly too the presence of impurities as for example iron compounds from the walls of the vessel give the product a more opaque appearance.

The present invention therefore contemplates treating rubber with an excess of chlorine under high pressure preferably in the liquid state and preferably also at temperatures elevated slightly above ordinary room temperature to yield chlorinated or perchlorinated rubber products which have passed through a fluxing stage due to the solvent action of an excess of chlorine which therefore have been exposed to the action of chlorine under conditions highly favorable for intensive chlorination and the production of rubber compounds containing chlorine present in an amount ranging upwards to well over 70 per cent of combined chlorine. Thus octo, nono, deca and even higher stages of chlorinated rubber may be obtained. The product derived by the concurrent chlorinating and fluxing action of an excess of chlorine on rubber constitutes a feature of the present invention. The use of more chlorine, in the initial stage of the process, than can combine with the rubber, is hereinafter referred to in the expression "in excess of combining requirements."

The chlorine is preferably fairly pure although works chlorine which normally contains some oxygen or air and other impurities may be used in some cases. Also it is possible to introduce into the chlorine various other reactive or catalytic substances such as bromine or iodine.

Procedures which will serve to illustrate the present invention, but which are capable of various modifications as will now be apparent from this disclosure are the following.

Example 1.—202 grams of crepe rubber in the form of a loosely wound spiral was placed in an open lead vessel to prevent contact with iron, which in turn was placed inside of an apparatus designed to contain chlorine under pressure. This apparatus was connected to a cylinder of liquid chlorine in such a way that only the gas therefrom could pass over into the chlorinating vessel. The chlorination was made at ordinary atmospheric temperatures ranging from 11° to 29° C., the average being in the neighborhood of 23° C. The temperature taken inside the chlorinating vessel varied from 11° to 44° C., the higher temperature in this case being due to the heat generated in the reaction. The pressure shown on the gauge connected with the apparatus varied from 85 to 132 pounds per square inch, being most of the time in the neighborhood of 100 to 110 pounds per square inch. Chlorination was continued for about 300 hours the gas being vented from the chlorinating vessel every 24 hours in order to purge it from hydrogen chloride which is also formed during the reaction. The product formed in this experiment was in the form of a consolidated mass of material of yellow or greenish yellow color and vesiculated structure. It weighed 707 grams and after washing in order to remove uncombined chlorine, hydrogen chloride and other impurities, it was ground and found to be soluble in benzol and similar hydrocarbons.

The use of chlorine under higher pressures accelerates the reaction as shown in the following example.

Example 2.—193 grams of crepe rubber were placed in a chlorinating vessel similar to that described in Example 1 and subjected to chlorine under high pressure. The liquid chlorine cylinder as well as the chlorinating vessel were heated slightly above the atmospheric temperature by means of warm water in order to increase the pressure of the chlorine. In this case the chlorine pressure varied from 240 to 320 pounds per square inch as shown on the gauge connected with the apparatus averaging in the neighborhood of 270 pounds per square inch. The temperature measured on the inside of the chlorinating vessel ranged from 57° to 67° C. Chlorination in this instance was continued for 12 hours after which on inspection it was found that the reaction was not complete. Chlorination was therefore continued for 17 hours longer under the same conditions making a total of 29 hours chlorination. The product in this case was a consolidated vesiculated mass similar in all respects to that described in Example 1.

Liquid chlorine in contact with the rubber to be chlorinated tends to enhance the uniformity of the reaction and still higher pressures make the reaction still more rapid as shown in the following procedure.

Example 3.—127 grams of crepe rubber were placed in the chlorinator described in Example 1 and this was connected to the liquid chlorine cylinder. The cylinder was then heated somewhat above atmospheric temperature by means of warm water while the chlorinator was kept cool by means of cold water. In this manner chlorine was distilled over from the cylinder and condensed again as a liquid in the chlorinator thus bringing the rubber in direct contact with liquid chlorine. After the requisite amount had distilled the chlorinator was shut off from the cylinder by means of a valve and heated until the temperature shown on the inside of the vessel was 60° to 75° C. averaging 70° C. The corresponding pressure being 323 pounds per square inch. After 27 hours chlorination under these conditions the chlorinator was vented rapidly and the vessel opened. The lead inner vessel was found to contain a dark green viscous fluid consisting of a solution of the chlorinated product in chlorine. Upon standing open to the atmosphere the greater part of the chlorine evaporated yielding a consolidated vesiculated product similar to those described in Examples 1 and 2. Upon breaking this mass apart it was found that small pieces of the mass were translucent or transparent and of a rather good lustre. The whole mass however, on account of the bubbles occurring in the vesiculated structure, appeared opaque.

If desired the rubber may be cut or shredded into small pieces before chlorination in order to improve the uniformity and rapidity of penetration of the chlorine. Also the material may be partly chlorinated until it is sufficiently brittle to be broken up and ground and this ground material may then be again subjected to the action of chlorine until the reaction is complete and a highly soluble substance is formed. This also has the advantage of improving the accessibility to the chlorine of the material to be reacted upon.

The material obtained in all of the above examples after washing became white or very light yellow in color and could be ground readily to a coarse powder.

From the foregoing it will be noted that liquid chlorine causes rubber to swell and if enough is present a more or less homogeneous solution may be formed. Some observations tend to show that partially chlorinated rubber will form a more mobile solution than the raw rubber. This is in line with the general solubility characteristics of these substances.

However, it is found that gaseous chlorine under high pressure is taken up by the rubber in much the same way, but, it is probable, to a less extent. Both methods yield a consolidated mass of chlorinated rubber of a somewhat more compact and completely unified character than that described in copending applications as "coalesced". The employment of gaseous chlorine under high pressure renders useful the employment of temperatures somewhat above ordinary room temperature, 70–75° C. being satisfactory. Temperatures as low as 20–25° C. with correspondingly lower pressures may be employed but a longer time is necessary for the reaction.

Below certain minimum pressures the softening or solution of the rubber does not appear to take place. At temperatures of 20° C. and lower this minimum pressure is about 60 pounds per square inch above that of the atmosphere.

On the other hand, when liquid chlorine in direct contact with the rubber is used, the solution, or jelly-like mass of rubber may be preserved with a minimum of reaction if the temperature is kept low. When the temperature is allowed to rise reaction commences and if sufficient excess of liquid chlorine be present, a solution of chlorinated rubber will be formed.

When the greater part of the uncombined chlorine is allowed to evaporate spontaneously without elevation of the temperature, the resulting mass is composed of clear, lustrous material, enclosing a large number of fair sized bubbles. Thin films may be formed, which are transparent and very similar to films formed from the more usual solvents such as benzol.

High pressure chlorine, either with or without the actual presence of the liquid phase makes possible the formation of very highly chlorinated products, containing, if desired, 70 per cent or more of combined chlorine. Preferably products containing at least 50 per cent of combined chlorine are derived by the present process.

A sample of chlorinated rubber made by treating rubber with liquid chlorine was found in one case to contain between 68 and 69 per cent of combined chlorine. It was very readily soluble in benzol and similar solvents and when solutions were poured out on glass plates the solvent quickly evaporated leaving a hard brilliant transparent film. The hardness of the film was about 3, that is it was difficultly scratched by calcite and easily by fluorite. On exposure to heat fragments of the chlorinated rubber softened slightly at about 120° C., darkening somewhat at the same time. At 150° C. the mass became more discolored but did not soften further to any appreciable extent. At about 170° C. the fragments of the chlorinated rubber began to adhere.

The film will burn when placed in a flame but does not readily support combustion. Placed on a laboratory hot plate the film swelled to a white mass containing bubbles.

It may be noted that water present in the rubber or in the chlorine gas will collect at the bottom of the chlorinating chamber forming a strongly acid solution. When the separation of water occurs in any large measure provision should be made for its withdrawal or a false bottom provided which will allow a space in which the water may collect. The submergence of a portion of the rubber in acidulated water is not favorable for most uniform chlorination. When a product of lower quality is to be made the precaution of withdrawing the separated water generally is unnecessary.

One way of expressing the preferred procedure of the present invention is that of chlorinating rubber by exposing it to compressed chlorine in plasticising proportions to cause softening of the material undergoing chlorination, using chlorine either in gaseous or liquid form and on completion of chlorination to the degree desired in removing the excess of chlorine which is present to confer plasticity. The degree of plasticising may be slight or it may progress to various stages until a solution of the chlorinated rubber results.

This case is in part a continuation of Serial No. 575,045, filed July 15, 1922.

What we claim is:—

1. A chlorine-fluxed chlorinated rubber.

2. A chlorine-fluxed chlorinated rubber containing in excess of two-thirds of its weight of combined chlorine.

3. The process which comprises exposing rubber to the action of compressed chlorine in an amount substantially in excess of combining requirements whereby a chlorine-fluxed chlorinated rubber is obtained.

4. The process which comprises bringing chlorine under pressure into contact with fragments of rubber, the amount of chlorine employed being substantially in excess of the maximum combining requirements of the rubber and sufficient to form a solution of chlorinated rubber in chlorine.

5. The process of chlorinating rubber which consists in exposing the rubber to chlorine in such proportions under superatmospheric pressure as to produce a plastic mass to cause softening of the material undergoing chlorination and removing the excess of chlorine after chlorination has been carried to the desired stage.

6. As a new product, a plastic mass containing chlorinated rubber and a substantial amount of liquid free chlorin, such free chlorin serving as a plasticising agent for the normally solid chlorinated rubber.

7. The process which comprises softening unvulcanized rubber by exposing to more than double its weight of chlorine, under a liquefying temperature and pressure, whereby the rubber is softened, and permitting the chlorine to act upon the softened material to bring about substantial chlorination thereof.

8. The process which comprises softening unvulcanized rubber by exposing to more than double its weight of chlorine, under a liquefying temperature and pressure, whereby the rubber is softened, and permitting the chlorine to act upon the softened material to bring about substantial chlorination thereof, no solvent except chlorine being present.

9. The process which comprises softening unvulcanized rubber with several times its weight of chlorine in a liquid state and permitting reaction to take place, whereby a highly chlorinated rubber is produced.

10. A process which comprises introducing free chlorin into contact with unvulcanized rubber under pressure, until a softened mass is formed, and continuing the treatment until the rubber has combined with substantially more than double its own weight of chlorin.

11. A process which comprises adding to unvulcanized rubber, substantially more than double its own weight of chlorin, under pressure and temperature conditions allowing the direct formation of a soft plastic mixture.

12. An intermediate product in the production of chlorinated rubber comprising a plastic mixture containing chlorinated rubber and liquid chlorin.

13. The process which comprises exposing rubber softened by the action of liquid chlorine, to the action of chlorine under pressure, the latter being in an amount substantially in excess of combining requirements, and at an elevated temperature below the charring point of the material.

14. The process of making chlorinated rubber which comprises reacting with chlorine under superatmospheric pressure and at a temperature which is initially considerably above ordinary room temperature, but below the charring point of the material, on a loosely-packed mass comprising pieces of rubber softened by the action of liquid chlorine, the mass being freely permeable to chlorine, thus bringing about an exothermic reaction and consolidating the pieces into a coherent mass of chlorinated rubber.

CARLETON ELLIS.
NORRIS BOEHMER.